(12) United States Patent
Ait Ameur et al.

(10) Patent No.: US 12,617,302 B2
(45) Date of Patent: May 5, 2026

(54) FAST CHARGE DEVICE FOR AN ELECTRIC OR HYBRID VEHICLE

(71) Applicant: ACOME, Paris (FR)

(72) Inventors: Mehdi Ait Ameur, Romagny (FR); Christian Magdelaine, Parigne (FR)

(73) Assignee: ACOME, Paris (FR)

( * ) Notice: Subject to any disclaimer, the term of this patent is extended or adjusted under 35 U.S.C. 154(b) by 581 days.

(21) Appl. No.: 17/621,763

(22) PCT Filed: May 22, 2020

(86) PCT No.: PCT/EP2020/064326
§ 371 (c)(1),
(2) Date: Dec. 22, 2021

(87) PCT Pub. No.: WO2020/234467
PCT Pub. Date: Nov. 26, 2020

(65) Prior Publication Data
US 2022/0332203 A1 Oct. 20, 2022

(30) Foreign Application Priority Data

May 22, 2019 (FR) ...................................... 1905372

(51) Int. Cl.
*B60L 53/18* (2019.01)
(52) U.S. Cl.
CPC ..................................... *B60L 53/18* (2019.02)
(58) Field of Classification Search
CPC ...................................................... B60L 53/18
(Continued)

(56) References Cited

U.S. PATENT DOCUMENTS

| 10,826,050 B1 * | 11/2020 | Kaehr | .................. H01M 50/574 |
| 2014/0062397 A1 * | 3/2014 | Dyer | ..................... B60L 53/305 |
| | | | 320/109 |

(Continued)

FOREIGN PATENT DOCUMENTS

| CN | 102637480 A | 8/2012 |
| CN | 202694828 U | 1/2013 |

(Continued)

OTHER PUBLICATIONS

French preliminary search report issued for the priority application n° FR 1905372 mailed Jan. 15, 2020.
(Continued)

*Primary Examiner* — Nathaniel R Pelton
(74) *Attorney, Agent, or Firm* — Thomas | Horstemeyer, LLP

(57) ABSTRACT

The invention concerns a charging device for a hybrid or electric vehicle intended to be connected to an electricity distribution network (2) on the one hand, and to the terminals of the battery (10) of a hybrid or electric vehicle on the other hand, the device comprising two charging cables (61, 62) suitable for running, independently of each other, inside the vehicle, each being intended to be connected to a terminal of the battery, each charging cable (61, 62) comprising an electrical conductor (8) and at least one insulating layer (9) surrounding the electrical conductor (8), each charging cable further comprising a protective device (G) consisting of at least once sheath (G1, G2) disposed around the insulating layer and matching the assembly formed by the electrical conductor (8) and the actuating layer (9).

13 Claims, 2 Drawing Sheets

(58) Field of Classification Search
USPC ........................................................ 320/109
See application file for complete search history.

(56) References Cited

U.S. PATENT DOCUMENTS

| | | | |
|---|---|---|---|
| 2015/0129334 A1 | 5/2015 | Nagamori | |
| 2016/0082943 A1 | 3/2016 | Kodawara | |
| 2016/0276064 A1 | 9/2016 | Suguro | |
| 2018/0174709 A1* | 6/2018 | Hagi ..................... B60L 15/00 |

FOREIGN PATENT DOCUMENTS

| | | | |
|---|---|---|---|
| CN | 103843220 | A | 6/2014 |
| CN | 200950363 | Y | 6/2014 |
| CN | 105235487 | A | 1/2016 |
| CN | 105702357 | A | 6/2016 |
| CN | 106910555 | A | 6/2017 |
| CN | 108447600 | A | 8/2018 |
| CN | 108944533 | A | 12/2018 |
| CN | 109326375 | A | 2/2019 |
| EP | 1033725 | A1 | 9/2000 |
| EP | 2711247 | A1 | 3/2014 |
| JP | 2007005137 | A | 1/2007 |
| JP | 2009110706 | A | 5/2009 |
| KR | 1020180001733 | | 1/2018 |
| KR | 20180001733 | U | 6/2018 |
| WO | 2010142917 | A1 | 12/2010 |
| WO | 2018017866 | A1 | 1/2018 |
| WO | 2019062972 | A1 | 4/2019 |

OTHER PUBLICATIONS

International search report issued for the PCT parent application PCT/EP2020/064326 mailed Jul. 27, 2020.
Chinese Office Action in related CN Application No. 2020800377251, mailed Mar. 21, 2024.
Chinese Office Action in related CN Application No. 2020800377251, mailed Oct. 10, 2024 (with English Translation).
Chinese OA in co-pending related Chinese Application No. Mehdi Ait Ameur, mailed Jun. 12, 2025.

* cited by examiner (PRIOR ART)

FIG. 3

(PRIOR ART)

FAST CHARGE DEVICE FOR AN ELECTRIC OR HYBRID VEHICLE

GENERAL TECHNICAL FIELD

The invention relates to the field of electric or hybrid vehicles. And it relates more particularly to the fast charging of such vehicles.

STATE OF THE ART

The advent of the electrically powered vehicles required the development of solutions for recharging the batteries of these vehicles.

As illustrated in FIG. 1, to recharge an electric vehicle 1, the electric battery 10 of the vehicle is connected to the electrical network 2 by a charging assembly comprising on either side of a connector 50 two cables 31, 32, 31', 32'. The connector 50 allows connecting the charging device to the vehicle or disconnecting it therefrom.

The charging of the vehicle is made either by means of an alternating current or by means of a direct current, the vehicles being equipped to be charged according to either of the other types of current.

In the context of a direct current charging, inside the vehicle, two cables 31, 32 are connected on the one hand to the terminals of the battery 10 of the vehicle (a cable 31 for the positive terminal of the battery and a cable 32 for the negative terminal of the battery) and on the other hand to the connector 50. The part between the connector 50 and the battery is therefore located inside the vehicle 1.

Outside the vehicle, two cables 31', 32' are connected on the one hand to the connector 50 and on the other hand to the electrical network 2. The part between the connector 50 and the electrical network 2 is therefore located outside the vehicle 1.

For the outer part, the two cables 31', 32' are preferably arranged within the same shell to form a power cable 40.

As illustrated in FIGS. 2 and 3, for the inner part, the cables 31, 32 are separately insulated and protected together with one or several braids 30, of textile or metallic nature. Particularly, each charging cable 31, 32 comprises an electrical conductor 8 surrounded by an insulating layer 9.

The outer part and the inner part constitute a charging assembly, the inner part constitutes an internal charging device.

Until now, the charging assemblies that have been developed allow obtaining recharging times of several hours (8 hours for example). These durations are considered too long for easy use of these vehicles.

Also, there is a need to reduce these durations with the aim of reaching durations of 15 minutes, or even 5 minutes, for a complete recharging of the battery.

As known, to decrease the charging duration, the electric current must be increased.

However, such an increase in the electric current is not without problems since an excessive heating of the system by the Joule effect ($W=R \cdot I^2$) is observed.

Particularly, the connector is dimensioned for a long-term charging and desired to be used in a short-term application. However, with an under-dimensioned conductive section, this results in a significant rise in temperature on this connector during the fast charging.

One solution to overcome this excessive heating is to increase the sections of electrical conductors of the cables and the connectors.

However, for reasons of standardization, it cannot be envisaged to modify the connector. And in addition, the increase of these sections inevitably leads to an increase in the cost and weight of the charging device, which is not desirable.

PRESENTATION OF THE INVENTION

The invention proposes to overcome the aforementioned drawback.

To this end, the invention proposes, according to a first aspect, a charging device for a hybrid or electric vehicle intended to be connected to an electricity distribution network on the one hand and to the terminals of a battery of a hybrid or electric vehicle on the other hand, said device comprising two charging cables, each being intended to be connected to a terminal of the battery, each charging cable comprising an electrical conductor and at least one insulating layer surrounding the electrical conductor, each charging cable further comprising a protection device consisting of at least one sheath disposed around the insulating layer by matching the assembly formed by the electrical conductor and the insulating layer.

The invention is advantageously supplemented by the following characteristics, taken alone or in any of their technically possible combinations:

said at least one sheath is disposed by an extrusion or co-extrusion method so as to be in intimate unbonded contact with the layer on which the sheath is disposed;
  said at least one sheath is a heat-shrinkable sheath so as to be in intimate unbonded contact with the layer on which the sheath is disposed;
  the protection device comprises a first sheath in contact with the insulating layer;
  the protection device further comprises a second sheath in contact with the first sheath;
  the first sheath and the second sheath have identical or different radial thicknesses;
  the first sheath and the second sheath are made of identical or different material;
  the first sheath and the second sheath, where appropriate, are made of a material chosen among: thermoplastic polymers, for example polyvinyl chloride, polyethylene, etc.
  the charging device comprises a connector comprising an input intended to be connected to a power cable itself connected to an electrical network and an output from which the charging cables extend.

According to a second aspect, the invention relates to a charging assembly for a hybrid or electric vehicle comprising a charging device according to the first aspect of the invention and a power cable intended to be connected to an electricity distribution network.

Providing one or several sheaths perfectly matching the assembly formed by the conductive element and the insulating layer instead of a conventional braid used to surround the cables allows promoting heat dissipation.

By providing for charging cables each having at least one sheath matching the assembly formed by the conductive element and the insulating layer, it is possible to eliminate the air gaps and to promote the heat dissipation of the charging device inside the vehicle and at the connector. The fast charging is therefore now possible.

The conventional use of one or several braids, which constitute a protection of electrical and/or mechanical nature for the charging cable, creates air gaps between the charging cables on the one hand but also between the braids. These air gaps interfere with the heat dissipation.

Indeed, the charging device, in particular when it is connected to the connector allows discharging the calories: by heat conduction from the connector to the electrical conductor of the charging cable; by heat conduction through the insulator of the charging cable; by heat conduction through the braid of the charging cable (mechanical and electrical protection) and the air gap generated by this braid; by natural convection and radiation to the environment of the charging cable. In addition, the heat dissipation of the power generated by the Joule effect in the electrically conductive elements depends on the conductivity of the conductive element, on the nature of the insulating layer and on the nature of the braid and of course on the presence of an air gap.

Accordingly, the advantages of the invention are as follows:

promoting the cable-environment heat exchange;

allowing discharging more quickly the calories provided on the connector;

allowing saving time in implementing the device of the charging cables;

allowing saving time in manufacturing the wiring harness entering the charging device;

allowing reducing the charging time (increasing the charging current).

PRESENTATION OF THE FIGURES

Other characteristics, aims and advantages of the invention will emerge from the following description which is purely illustrative and not limiting, and which should be read in relation to the appended drawings in which, in addition to FIGS. 1 to 3 already discussed:

FIG. 4 illustrates an overview of a charging device for an electric vehicle in accordance with the invention;

FIG. 5 illustrates a detailed view of a charging cable of a charging device in accordance with the invention.

In all of the figures, similar elements bear identical references.

DETAILED DESCRIPTION

Figure 1:
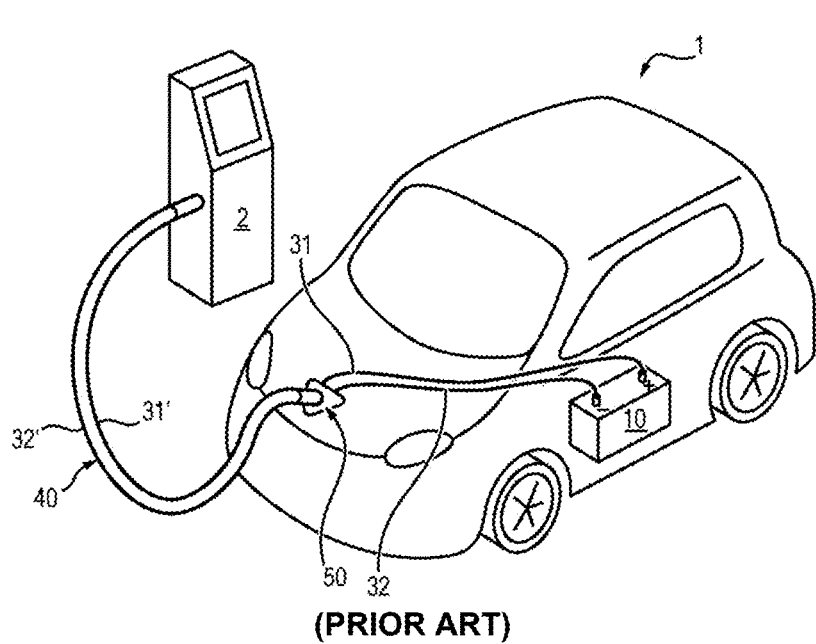
Figure 2:
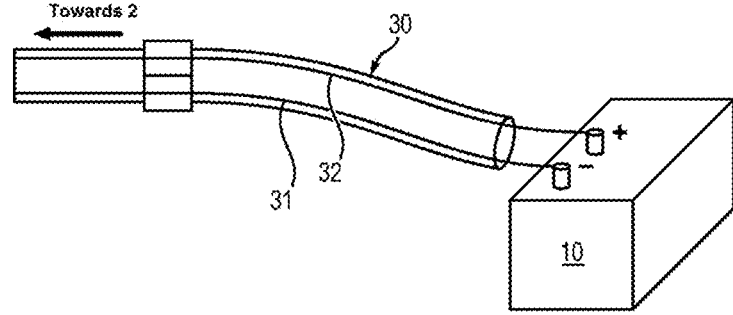
Figures 3, 4, 5:
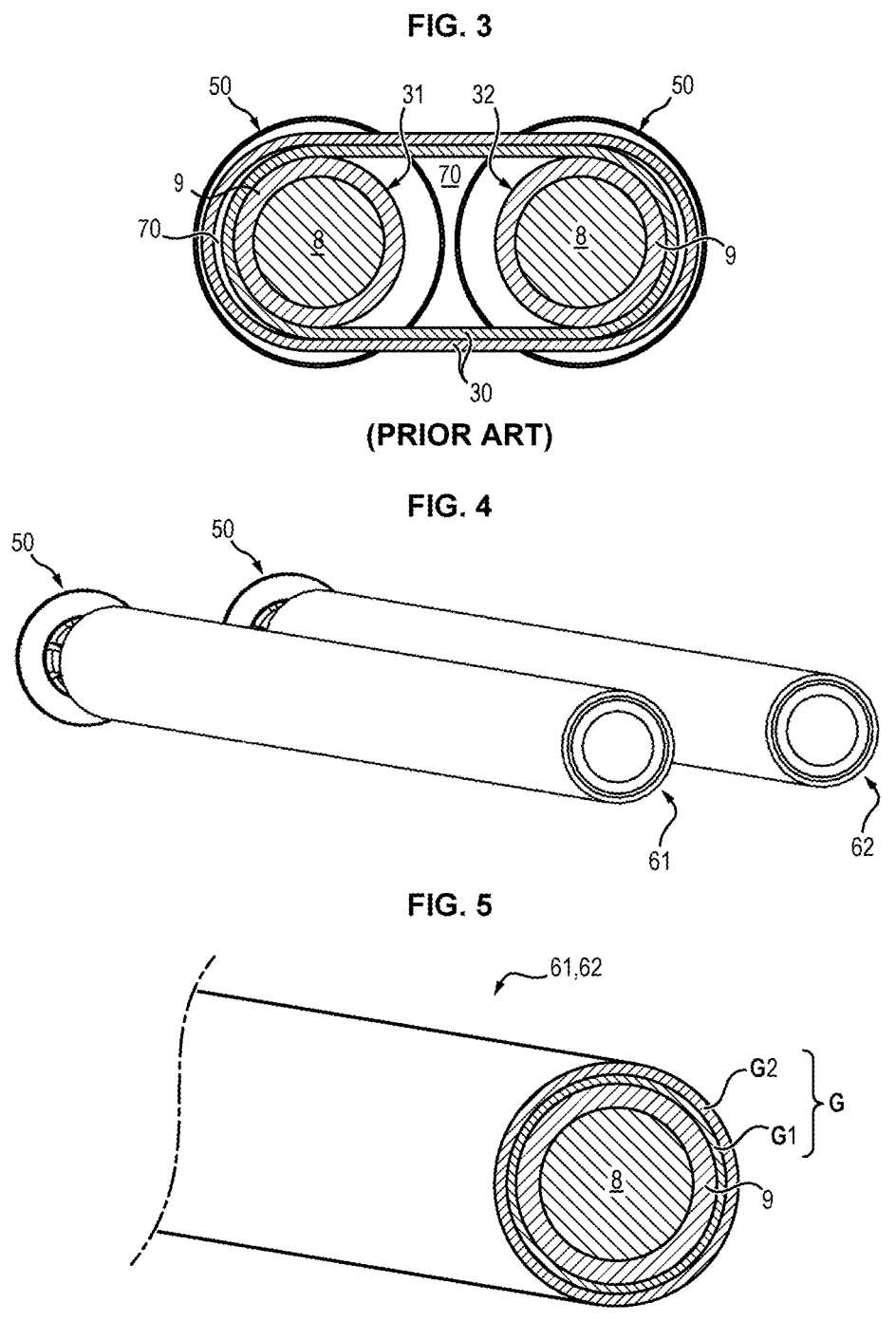

FIGS. 4 and 5 illustrate a charging device for an electric or hybrid vehicle intended to be disposed in the inner part of the electric or hybrid vehicle. Such a device comprises a connector 50 from which two charging cables 61, 62 extend to the battery (not represented). Particularly, the charging cables 61, 62 exit the terminals of the connector 50 independently of each other. They are not surrounded by any sheath or tube as it is the case in the prior art (see FIG. 2). In this way, the charging cables 61, 62 can run independently of each other inside the vehicle to go to the battery and thus pass through independent spaces. This allows facilitating the installation of the charging device.

Each charging cable 61, 62 must withstand a reference intensity which depends on the charging time required for the battery. For example, to recharge a 36 kw battery with alternating current, it takes 10 hours to fully recharge it (230 Vac×16 Ah=3.6 kWh).

Each charging cable comprises, as discussed above, an electrical conductor 8 surrounded by an insulating layer 9.

The electrical conductor 8 is, for example, made of copper, copper alloy, aluminum or aluminum alloy, etc.

The insulating layer 9 is for example made of thermoplastic material, PVC (lead-free polyvinyl chloride), XLPE (cross-linked polyethylene), etc.

Advantageously, each charging cable is identical in order to have a homogeneous distribution of the intensity.

Unlike the configuration presented in the introduction, the charging cables are not surrounded together by one or several braids but are individually surrounded by a protection device G comprising one or two sheaths G1, G2. Thus, for each charging cable, the assembly formed by the electrical conductor and the insulating layer is surrounded by the protection device G.

It can be provided that the protection device G comprises a first sheath G1 and possibly a second sheath G2. It will be understood that the notion of sheath used here is in no way comparable to any braid.

In addition, one charging cable can be surrounded by two sheaths while the other is surrounded by a single sheath.

Each sheath is advantageously disposed according to an extrusion or co-extrusion method in order to be in unbonded contact with the layer on which it is disposed. The unbonded contact contributes to facilitating the installation of the charging device, in particular for stripping the charging cable for its connection to the battery.

The sheath can be heat-shrinkable in nature.

More specifically, in the case of a protection device with a single sheath, the latter is in unbonded contact with the insulating layer 9 of the charging cable while in the case of a protection device with two sheaths G1, G2, the second sheath is in unbonded contact with the first sheath G1.

As will be understood, the sheath is in intimate contact with the layer on which it is deposited and allows avoiding having air gaps. Indeed, returning to FIG. 3 which shows two cables grouped together in two braids 30, air gaps 70 are present between the cables but also between the braids.

Each sheath G1, G2 is made of a material of homogeneous polymeric nature and is for example made of PVC (lead-free polyvinyl chloride), XLPE (cross-linked polyethylene) . . . material.

In the case of two sheaths, it can be provided that each sheath is made of a different material. Each type of sheath responds independently to the (electrical, mechanical, thermal) constraints which are difficult to verify by a single type of material.

Each sheath may have a radial thickness between 0.5 mm and 1.5 mm, preferably 0.7 mm or 1 mm. In addition, it can be provided that in the case of a protection device comprising two sheaths G1, G2 do not have the same radial thickness. Of course, the thickness of the two sheaths can be identical.

The greater the thickness of at least one sheath, the greater the section of the cable and the greater the heat dissipation.

The first sheath G1 may have a radial thickness greater than or less than the thickness of the second sheath G2.

According to a preferred embodiment, each charging cable is surrounded by two sheaths and has the following characteristics:

Radial thickness of the sheath G1: 1 mm

Radial thickness of the sheath G2: 0.70 mm

Radial thickness of the insulating layer: 2 mm

Diameter of the conductive element: 12.6 mm.

A configuration with two charging cables with the characteristics above was tested by circulating an intensity of 350 Å in each charging cable and compared to a configuration as presented in the introduction with two braids (see FIG. 3).

Thickness of the braid 1: 1 mm
Thickness of braid 2: 0.70 mm
Air gap average equivalent thickness: 5 mm
Radial thickness of the insulating layer: 2 mm
Diameter of the conductive element: 12.6 mm.

TABLE 1

|  | Configuration FIG. 3 with two braids | Configuration with two sheaths |
|---|---|---|
| Internal conductor temperature rise | 57.2° C. | 33.2° C. |
| Insulating layer temperature rise | 54.5° C. | 28.3° C. |
| Temperature rise at the connector | 60.4° C. | 46.2° C. |

A significant decrease in the temperature rise at several points of the charging device is indeed observed.

The invention claimed is:

1. A charging device for a hybrid or electric vehicle intended to be connected to an electricity distribution network and to the terminals of a battery of a hybrid or electric vehicle, the charging device comprising
   two charging cables for running independently of each other inside a vehicle,
   a connector comprising an input intended to be connected to a power cable itself connected to an electrical network and an output from which the charging cables extend;
   each of the two charging cables being intended to be connected to a terminal of the battery at one end of the cable, and at the other end to a terminal of the connector output,
   each charging cable comprising an electrical conductor and at least one insulating layer surrounding the electrical conductor,
   means for promoting heat dissipation, comprising at least one sheath arranged around the insulating layer, the sheath matching an assembly formed by the electrical conductor and the insulating layer,
   wherein said at least one sheath is in intimate unbonded contact with the insulating layer for avoiding air gaps between the sheath and the insulating layer for promoting heat dissipation from the charging device inside the vehicle and at the connector.

2. The charging device according to claim 1, wherein said at least one sheath is disposed by an extrusion or co-extrusion method so as to be in intimate unbonded contact with the insulating layer on which the sheath is disposed.

3. The charging device according to claim 1, wherein said at least one sheath is a heat-shrinkable sheath so as to be in intimate unbonded contact with the layer on which the sheath is disposed.

4. The charging device according to claim 1, wherein the protection device comprises a first sheath in contact with the insulating layer.

5. The charging device according to claim 4, wherein the protection device further comprises a second sheath in contact with the first sheath.

6. The charging device according to claim 5, wherein the first sheath and the second sheath have identical radial thickness.

7. The charging device according to claim 6, wherein the first sheath and the second sheath are made of identical material.

8. The charging device according to claim 4, wherein the sheath is made of a material chosen among thermoplastic polymers.

9. A charging assembly for a hybrid or electric vehicle comprising the charging device according to claim 1 and a power cable intended to be connected to an electricity distribution network.

10. The charging device according to claim 6, wherein the first sheath and the second sheath are made of different material.

11. The charging device according to claim 8, wherein the thermoplastic polymer is polyvinyl chloride.

12. The charging device according to claim 8, wherein the thermoplastic polymer is cross linked polyethylene.

13. The charging device according to claim 5, wherein the first sheath and the second sheath have different radial thicknesses.

* * * * *